United States Patent
Arima et al.

(10) Patent No.: US 10,040,111 B2
(45) Date of Patent: Aug. 7, 2018

(54) METHOD OF MANUFACTURING LAMINATED IRON CORE

(71) Applicant: MITSUI HIGH-TEC, INC., Kitakyushu-shi, Fukuoka (JP)

(72) Inventors: Souhachi Arima, Fukuoka (JP); Tomohiko Hayata, Fukuoka (JP)

(73) Assignee: MITSUI HIGH-TEC, INC., Fukuoka (JP)

(*) Notice: Subject to any disclaimer, the term of this patent is extended or adjusted under 35 U.S.C. 154(b) by 482 days.

(21) Appl. No.: 14/708,495

(22) Filed: May 11, 2015

(65) Prior Publication Data
US 2015/0325366 A1 Nov. 12, 2015

(30) Foreign Application Priority Data

May 12, 2014 (JP) ................................ 2014-098706

(51) Int. Cl.
*H01F 3/04* (2006.01)
*H01F 7/06* (2006.01)
(Continued)

(52) U.S. Cl.
CPC ............. *B21D 28/22* (2013.01); *B21D 28/02* (2013.01); *B21D 39/032* (2013.01);
(Continued)

(58) Field of Classification Search
CPC ...... B21D 28/22; B21D 39/032; B21D 28/02; H01F 41/0233; H02K 15/03;
(Continued)

(56) References Cited

U.S. PATENT DOCUMENTS 4,738,020 A * 4/1988 Neuenschwander .. B21D 28/22
29/598
6,237,214 B1 * 5/2001 Neuenschwander .. B21D 28/22
29/564.2
(Continued)

FOREIGN PATENT DOCUMENTS

CN 101987463 3/2011
CN 102211128 10/2011
(Continued)

OTHER PUBLICATIONS

Office Action issued in China Counterpart Patent Appl. No. 201510239509.6, dated Jun. 2, 2017 , along with an English translation thereof.
(Continued)

*Primary Examiner* — Donghai D Nguyen
(74) *Attorney, Agent, or Firm* — Greenblum & Bernstein, P.L.C.

(57) ABSTRACT

A method of manufacturing a laminated iron core includes performing at least two kinds of selectively-actuated punching processes by actuating respective punching units to form a plurality of iron core pieces, each of the punching units being switchable between an active state or a non-active state, and caulking and laminating the plurality of iron core pieces to manufacture the laminated iron core. The selectively-actuated punching processes are performed in one operation by selectively actuating each of the punching units between the active state and the non-active state.

3 Claims, 8 Drawing Sheets

(51) Int. Cl.
  *B21D 28/22* (2006.01)
  *H01F 41/02* (2006.01)
  *H02K 15/03* (2006.01)
  *B21D 28/02* (2006.01)
  *B21D 39/03* (2006.01)

(52) U.S. Cl.
  CPC ......... *H01F 41/0233* (2013.01); *H02K 15/03* (2013.01); *Y10T 29/4908* (2015.01); *Y10T 29/5317* (2015.01)

(58) Field of Classification Search
  CPC ......... Y10T 29/49009; Y10T 29/49012; Y10T 29/49078; Y10T 29/5317
  USPC .................................................. 29/598, 609
  See application file for complete search history.

(56) References Cited

U.S. PATENT DOCUMENTS

| | | |
|---|---|---|
| 2004/0011456 A1 | 1/2004 | Futamura et al. |
| 2011/0023679 A1 | 2/2011 | Majima et al. |
| 2011/0024489 A1 | 2/2011 | Sakakibara et al. |
| 2011/0277939 A1 | 11/2011 | Hirata |

FOREIGN PATENT DOCUMENTS

| | | |
|---|---|---|
| CN | 102244437 | 11/2011 |
| CN | 202356562 | 8/2012 |
| CN | 202667404 | 1/2013 |
| EP | 1121211 | 10/2003 |
| JP | 63-228945 | 9/1988 |
| JP | 04-279222 | 10/1992 |
| JP | 2004-153928 | 5/2004 |
| JP | 2011-36039 | 2/2011 |

OTHER PUBLICATIONS

Office Action issued in Japan Counterpart Patent Appl. No. 2014-098706, dated Jan. 16, 2018 , along with an English translation thereof.

* cited by examiner

FIG.4
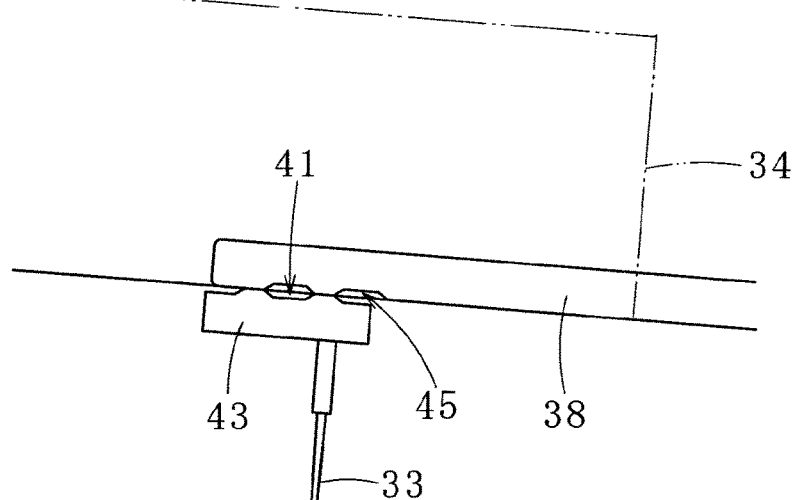
(A)
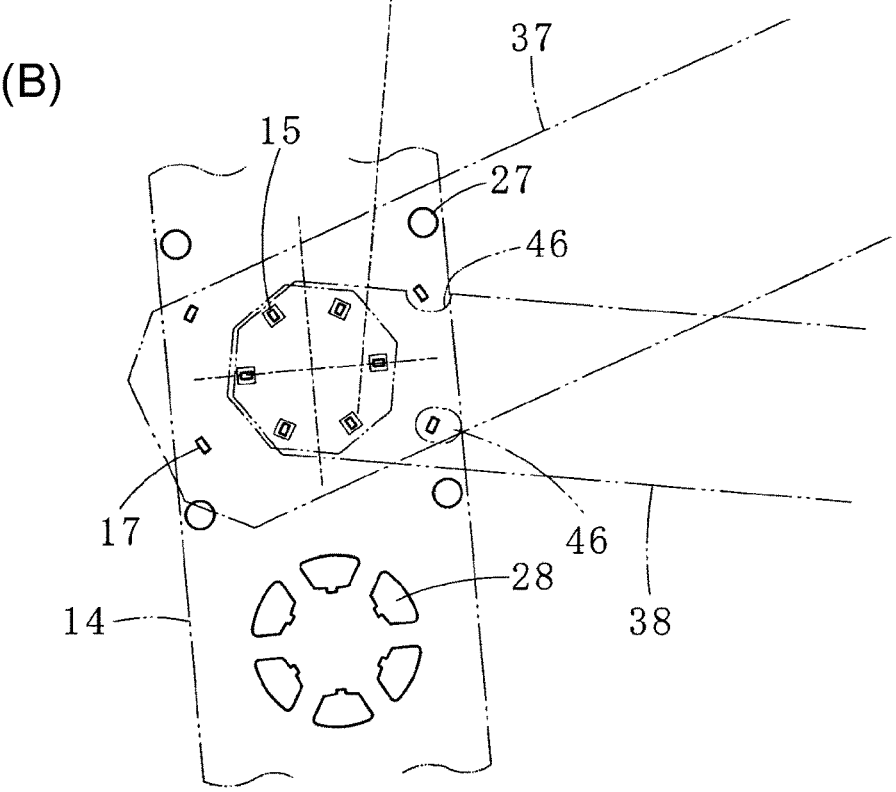
(B)

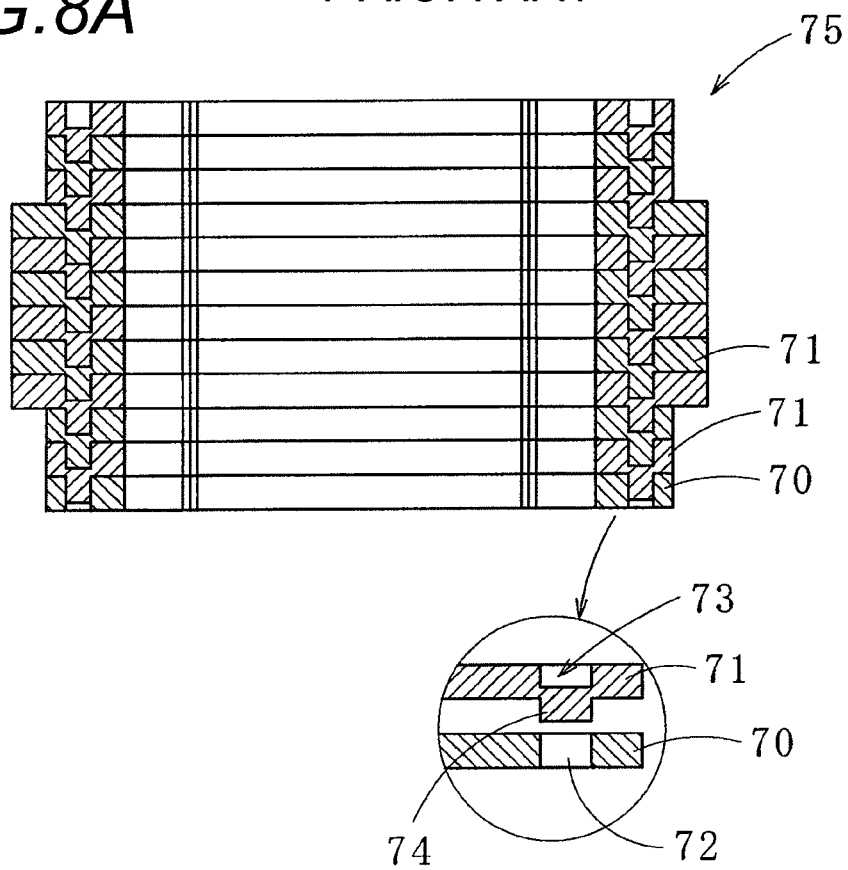
FIG.8A --PRIOR ART--
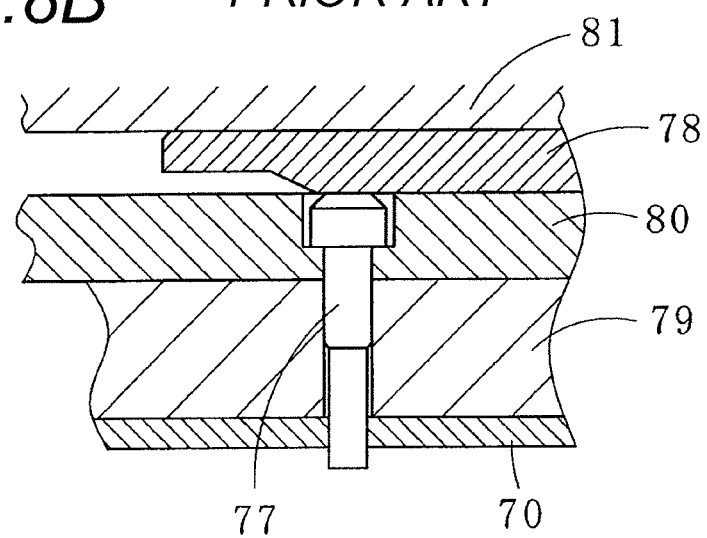
FIG.8B --PRIOR ART--

METHOD OF MANUFACTURING LAMINATED IRON CORE

CROSS REFERENCE TO RELATED APPLICATIONS

This application is based upon and claims the benefit of priority of Japanese Patent Application No. 2014-098706 filed on May 12, 2014, the contents of which are incorporated herein by reference in its entirety.

BACKGROUND OF THE INVENTION

1. Field of the Invention

The present invention relates to a method and an apparatus by which iron core pieces are punched or blanked by press working a material (for instance, a thin metal sheet) and the blanked iron core pieces are laminated to manufacture a laminated iron core.

2. Description of the Related Art

For instance, as disclosed in JP-A-63-228945, a thin metal sheet is sequentially fed to a die apparatus having a plurality of working stations to carry out a blanking or stamping work (a punching work) respectively in the working stations and iron core pieces are blanked or stamped out, dropped into and laminated in the die in a final station.

As shown in FIG. 8A, when caulking parts are formed in the laminated iron core pieces 70 and 71, in the first iron core piece 70 located in a bottom, a caulking through hole 72 is formed. In the iron core pieces 71 after the first iron core piece 70, V shaped caulking parts 73 are formed. A caulking protrusion 74 of the V shaped caulking part 73 is prevented from protruding from a back surface of a laminated iron core 75.

The caulking through hole 72 and the V shaped caulking part 73 are located at the same positions of the iron core pieces 70 and 71 in plan view. As shown in FIG. 8B, a slide plate 78 is provided above a punch 77 which can move upward and downward to carry out a selectively-actuated punching operation that the slide plate 78 is horizontally moved to selectively blank or stamp a material (the iron core piece 70) by the punch 77. FIG. 8B shows a stripper plate 79, a guide member 80 of the slide plate 78, and an upper die 81.

SUMMARY OF THE INVENTION

However, since the selectively-actuated punching operation disclosed in JP-A-63-228945 includes one kind of operation in one operation, when the number of processes which require the selectively-actuated punching operation is increased, the size of the die becomes large in a feeding direction of the material. Especially, when the form of the iron core piece is complicated, a plurality of selectively-actuated punching operations is necessary. Thus, a problem arises that the size of the die exceeds the size of a press, and accordingly, the die cannot be mounted on the press.

The present invention is devised by considering the above-described circumstances, and it is a non-limited object of the present invention to provide a method and an apparatus of manufacturing a laminated iron core that have a plurality of punching units, each of which are switchable between an active state and a non-active state in one station (namely, one operation) and can shorten an entire length of a die.

A first aspect of the present invention provides a method of manufacturing a laminated iron core, the method including: performing at least two kinds of selectively-actuated punching processes by actuating respective punching units to form a plurality of iron core pieces, each of the punching units being switchable between an active state or a non-active state; and caulking and laminating the plurality of iron core pieces to manufacture the laminated iron core, wherein the at least two kinds of selectively-actuated punching processes are performed in one operation by selectively actuating each of the punching units between the active state and the non-active state.

A second aspect of the present invention provides a method according to the first aspect, wherein the one operation includes processes performed in one station.

A third aspect of the present invention provides a method according to the first aspect, wherein each of the punching units has a punch and a die and is controlled to switch between the active state and the non-active state by moving a slide member which holds a top part of the punch.

A fourth aspect of the present invention provides an apparatus of manufacturing a laminated iron core, the apparatus including: a plurality of stations in which pressing processes are sequentially performed on a thin metal sheet which is conveyed in the plurality of stations, wherein the plurality of stations includes a final station in which iron core pieces are blanked off in an outer profile from the thin metal sheet, and the iron core pieces are crimped and laminated in a die to manufacture the laminated iron core, and wherein one of the plurality of stations excluding the final station includes at least two kinds of punching units, each of which is switchable between an active state and a non-active state, and the one of the plurality of stations performs at least two kinds of selectively-actuated punching processes on the thin sheet material by actuating the at least two kinds of punching units simultaneously or selectively.

A fifth aspect of the present invention provides an apparatus according to the fourth aspect, wherein the punching units include a first punching unit having a pair of first punch and a first die and a second punching unit having a pair of a second punch and a second die, and the first and second punching units respectively have first and second slide members which position top parts of the first and second punches to switch the first and second punching units between the active state and the non-active state.

A sixth aspect of the present invention provides an apparatus according to the fifth aspect, wherein the first slide member is arranged in a lower part of an upper die unit and the second slide member is arranged in an upper part of the upper die unit.

A seventh aspect of the present invention provides an apparatus according to the fifth or sixth aspect, wherein the first punching unit punches a working part located in an inside area of the iron core piece and the second punching unit punches a working part located in an outside area of the iron core piece.

In the method of manufacturing a laminated iron core according to the first to third aspects and the apparatus of manufacturing a laminated iron core according to the fourth to seventh aspects of the present invention, since the two or more kinds of punching units are selectively actuated in the one operation or the one station, a distance between the processes in a conveying direction of the thin metal sheet can be shortened. Thus, the size of the die can be reduced in a direction of a conveyance of the material.

BRIEF DESCRIPTION OF THE DRAWINGS

In the accompanying drawings:

FIG. 4 includes (A) and (B) which are explanatory diagrams of the manufacturing apparatus used in the manufacturing method of the laminated iron core according to the exemplary embodiment;

FIG. 8A is a sectional view of the laminated iron core according to the usual example; and FIG. 8B is an explanatory diagram of the manufacturing method (an apparatus) of the laminated iron core according to the usual example.

DETAILED DESCRIPTION OF THE EXEMPLARY EMBODIMENTS

Subsequently, by referring to the accompanying drawings, an exemplary embodiment which embodies the present invention will be described below.

Figure 2:
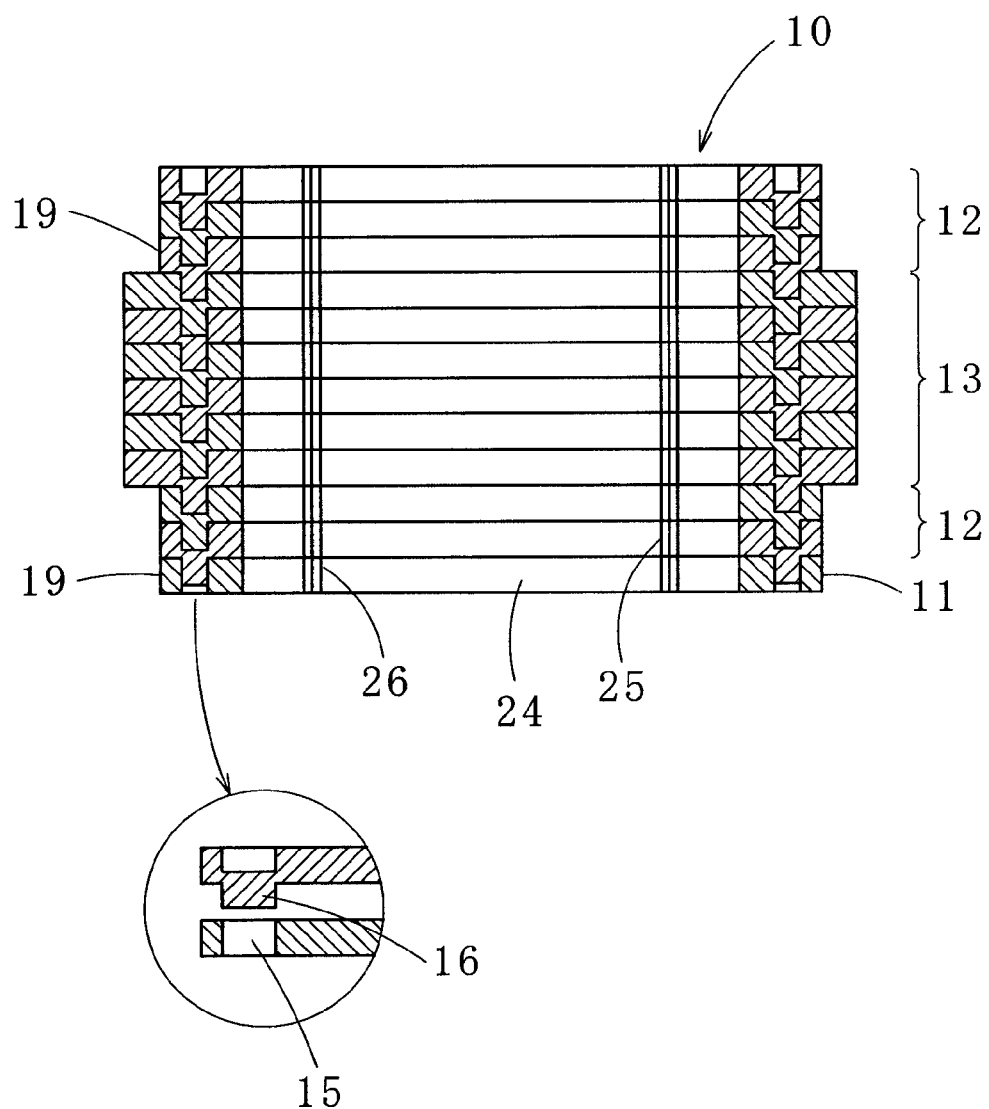
FIG. 2 is a sectional view of the laminated iron core manufactured by the manufacturing method of the laminated iron core according to the exemplary embodiment.

Initially, a laminated iron core 10 shown in FIG. 2 will be described below. The laminated iron core 10 is formed in such a way that a plurality of iron core pieces 11, 12 and 13 are worked by a die apparatus, and caulked and laminated in a die in a final station.

In the iron core piece 11 of a lowermost part, a caulking through hole 15 is formed. In other iron core pieces 12 and 13, a plurality of caulking parts (V shaped caulking parts, half blanked caulking parts) 16 are respectively formed to connect together the iron core pieces 11 to 13. The caulking through hole 15 of the iron core piece 11 has a rectangular form in plan view. These iron core pieces 11 to 13 are manufactured by sequentially feeding a thin magnetic metal sheet 14 (see FIG. 1) to the die apparatus and press working the thin magnetic metal sheet 14.

Further, in the iron core pieces 11 and 12, at positions of prescribed angles in a circumferential direction outside a radial direction (in the present exemplary embodiment, a top part is set to a position of 0°, a position of 30°, a position of 150°, a position of 210°, a position of 330°), are provided recessed parts 19 and protruding parts 20 (see FIG. 1B) having prescribed widths (10 to 30°) in the circumferential direction to quicken a cooling operation. FIG. 2 shows a shaft hole 24 in which a rotor is arranged, and teeth ends 25 and 26. Further, the iron core piece 13 has a circular form having no recessed parts, nor protruding parts in a periphery.

When the iron core piece 11 having the caulking through hole 15 and the recessed part 19, the iron core piece 12 having the recessed part 19 and the iron core piece 13 having no recessed part 19 are manufactured, usually are provided, as shown in FIG. 1A, a first process that pilot holes 27 are formed in the thin metal sheet 14 to be sequentially fed to the die apparatus, a second process that slots 28 are blanked or punched out, a third process that blanking holes 17 are formed which form the recessed parts (slits) 19 in the circumference, a fourth process that the caulking through holes 15 are formed, a fifth process that the caulking parts 16 are formed, a sixth process that an inner hole 30 is formed and a seventh process (a final station) that outer configurations of the iron core pieces 11 to 13 are blanked or stamped out to caulk and laminate the iron core pieces 11 to 13 in the die. Between the sixth process and the seventh process, an idle process is provided in an idle station. The idle process in the idle station is not essential. Accordingly, in the usual technique, since the process that the blanking holes 17 are formed, the process that the caulking through holes 15 are formed and the process that the caulking parts 16 are formed are carried out in separate stations, the die apparatus is long in a conveying direction of the thin metal sheet 14.

On the other hand, in a manufacturing method of the laminated iron core according to one exemplary embodiment of the present invention, as shown in FIG. 1B, are provided a process 1a that pilot holes 27 are formed, a process 2a that slots 28 forming outlines of magnetic pole parts are blanked or stamped out, a process 3a that blanking holes 17 forming the recessed parts 19 of the circumference and the caulking through holes 15 are formed at the same time, a process 4a that the caulking parts 16 are formed, a process 5a that an inner hole 30 is formed, a process 6a (a final station) that outer configurations of the iron core pieces 11 to 13 are blanked or stamped out to caulk and laminate the iron core pieces 11 to 13 in a die and an idle process between the process 5a and the process 6a. Since a technique that the pilot holes 27, the slots 28, the caulking through holes 15 and the blanking holes 17 forming the recessed parts 19, the caulking parts 16 and the inner hole 30 are blanked or stamped out, the outer configurations of the iron core pieces 11 to 13 are blanked or stamped out and the recessed parts 19 are formed in the circumference of the laminated iron core 10 is well known, a detailed explanation thereof is omitted.

In the manufacturing method of the laminated iron core according to the one exemplary embodiment of the present invention, since the process that the blanking holes 17 are blanked or stamped out and the process that the caulking through holes 15 are formed are carried out in the same station, a distance between the processes can be more shortened in the conveying direction of the thin metal sheet 14 than that of the manufacturing method of the laminated iron core according to the usual example.

Further, the process that the blanking holes 17 are blanked, the process that the caulking through holes 15 are formed and the process that the caulking parts 16 are formed can be carried out in one operation, namely, in one station (excluding the final station). In this case, the distance between the processes can be more shortened. In the processes having a small punching load, other parts may be blanked or stamped out simultaneously.

Namely, in the one station excluding the final station, at least two kinds of punching units are provided, each of which is switchable between an active state and an non-active state so that a plurality of selectively-actuated punching processes may be simultaneously or selectively carried out for the thin metal sheet 14.

Subsequently, by referring to FIG. 3 to FIG. 7, the method and an apparatus of manufacturing the laminated iron core according to the one exemplary embodiment of the present invention will be more specifically described below.

Figure 1:
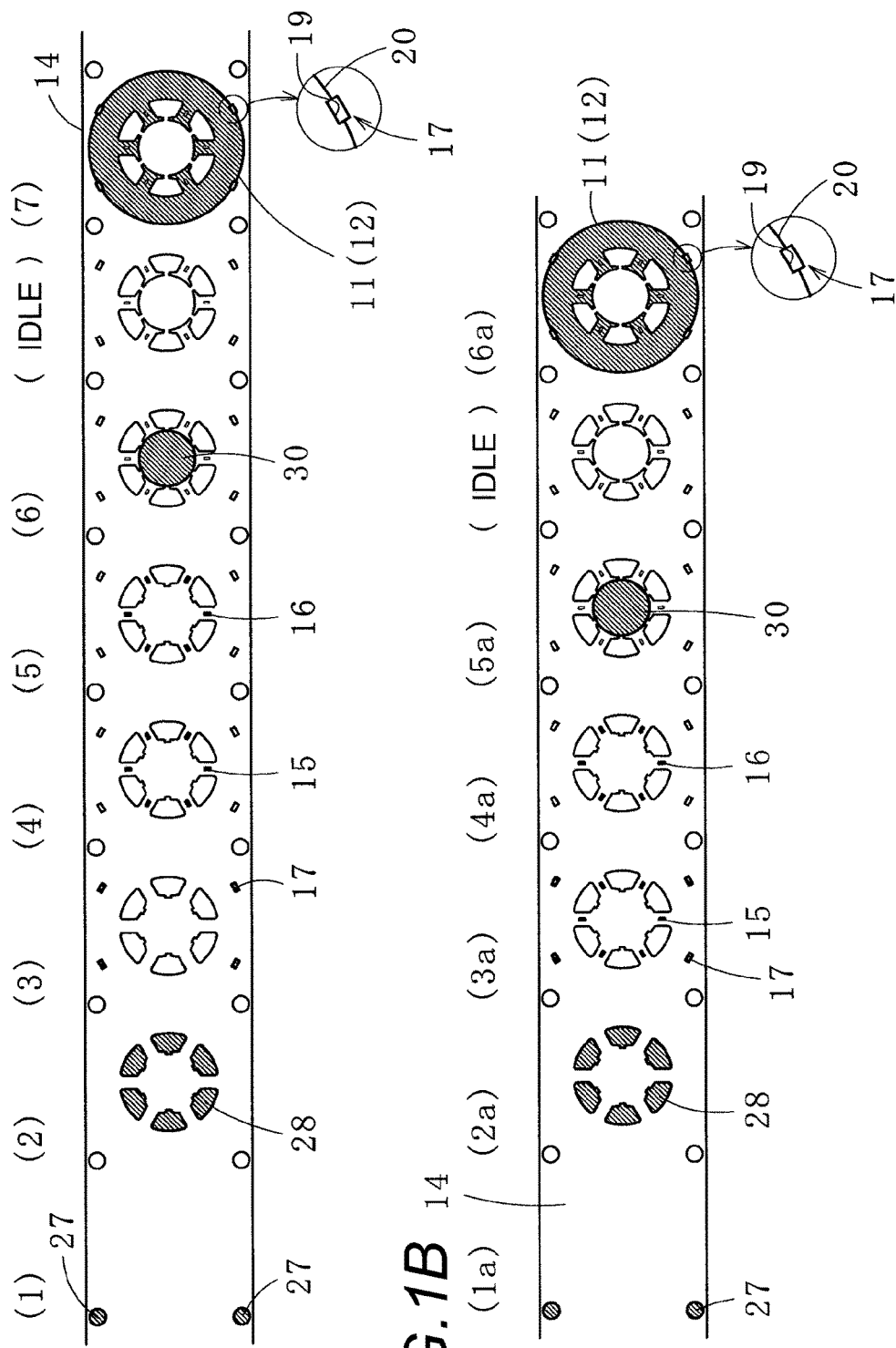
FIG. 1A is a process diagram showing a manufacturing method of a laminated iron core according to a usual example.
FIG. 1B is a process diagram showing a manufacturing method of a laminated iron core according to one exemplary embodiment of the present invention.
Figure 3:
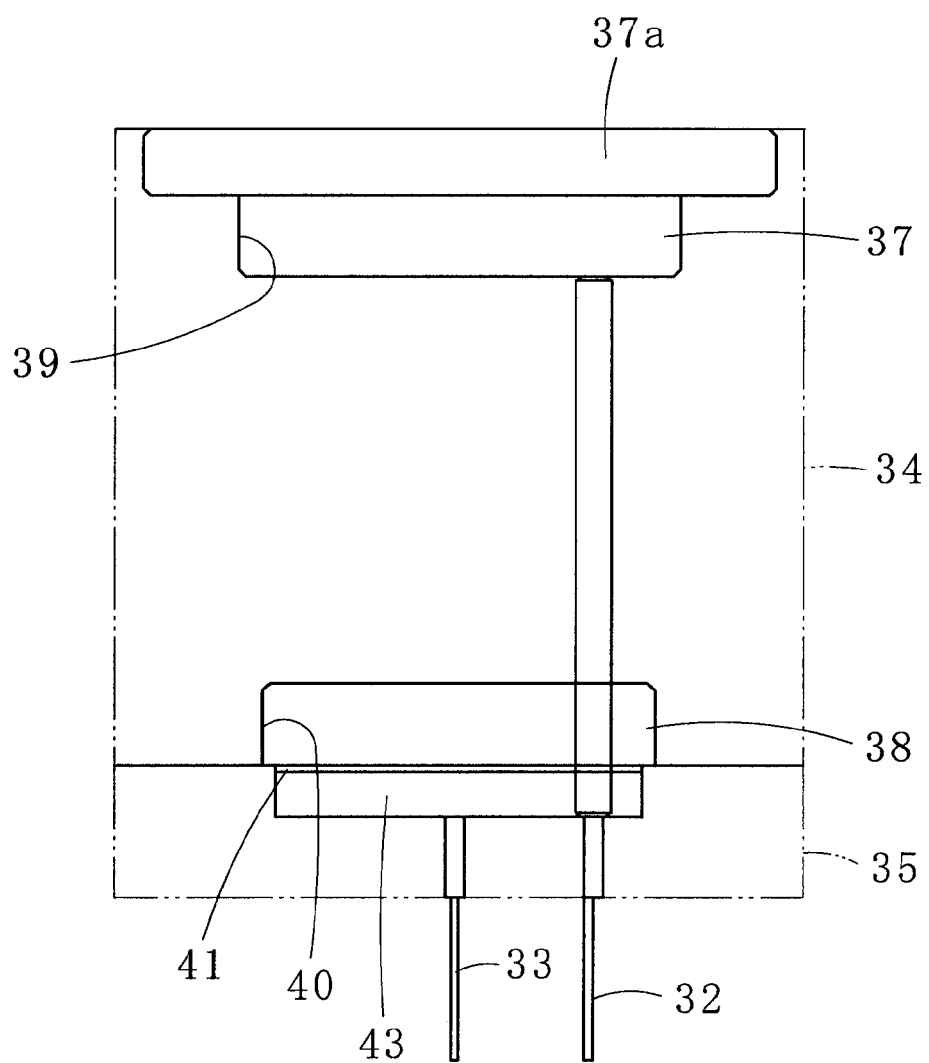
FIG. 3 is an explanatory diagram of a manufacturing apparatus used in the manufacturing method of the laminated iron core according to the exemplary embodiment.

As shown in the process 3a in FIG. 1, when two kinds of through holes, for instance, the caulking through holes 15 and the blanking holes 17 are formed at the same time (i.e., for forming the iron core piece 11) or selectively (i.e., for forming the iron core piece 12) in the one station, a prescribed number of two kinds of punches 33 (first punches) and 32 (second punches) are respectively used. The punches 33 and 32 configure as first and second punching units which are paired with dies (a first die, a second die) not shown in the drawings and can be switchable between the active state and the non-active state. The punch 32 as the second punching unit serves to blank or stamp out the blanking holes (working parts located in outside areas of the iron core pieces 11 and 12) 17 as shown in FIG. 3, (A) and (B) of FIG. 6 and (A) and (B) of FIG. 7. In the present exemplary embodiment, the four punches 32 are provided. Further, as shown in FIG. 3, (A) and (B) of FIG. 4 and (A) and (B) of FIG. 5, the punch 33 as the first punching unit serves to blank or stamp out the caulking through holes (working parts located in inside areas of the iron core piece 11) 15. In the present exemplary embodiment, the six punches 33 are provided.

The punches 32 and 33 shown in FIG. 3 are provided so as to be lifted and lowered in guide members (one examples of an upper die, also referred to as "punch holders") 34 and 35. In upper and lower parts of the guide member 34, a slide plate 37 (one example of a second slide member) and a slide plate 38 (one exempla of a first slide member) are arranged so as to move forward and backward (capable of being put in and out) in guide grooves 39 and 40 by a cylinder not shown in the drawings toward a direction which intersects at right angles to a surface of a sheet of FIG. 3. In a lower part of the guide member 35, a stripper plate not shown in the drawings is provided. When the thin metal sheet 14 is worked, the thin metal sheet 14 is pressed to a lower die by the stripper plate. Further, in an upper end of each of the punches 33, a slide cam 43 having an irregular part 41 is provided. In the slide cam 43, only one punch 33 is shown in FIG. 3; however, the six punches 33 are provided in this embodiment.

In the process 3a shown in FIG. 1B, the blanking holes 17 and the caulking through holes 15 are blanked or stamped out in the one operation. Accordingly, in this case, as shown in (A) and (B) of FIG. 4, the punch 33 is not lifted to be active due to an irregular part 45 of the slide plate 38 and the irregular part 41 of the slide cam 43 (namely, protruding parts of both the irregular parts are located at the same positions) and cooperates with the lower die so that the caulking through holes 15 may be formed. A top part of the punch 33 is positioned by the slide plate 38 to actuate the punching unit. In this case, since the punch 32 which forms the blanking holes 17 interferes with the slide plate 38, partly cut out parts 46 are provided in the slide plate 38.

Figure 5:
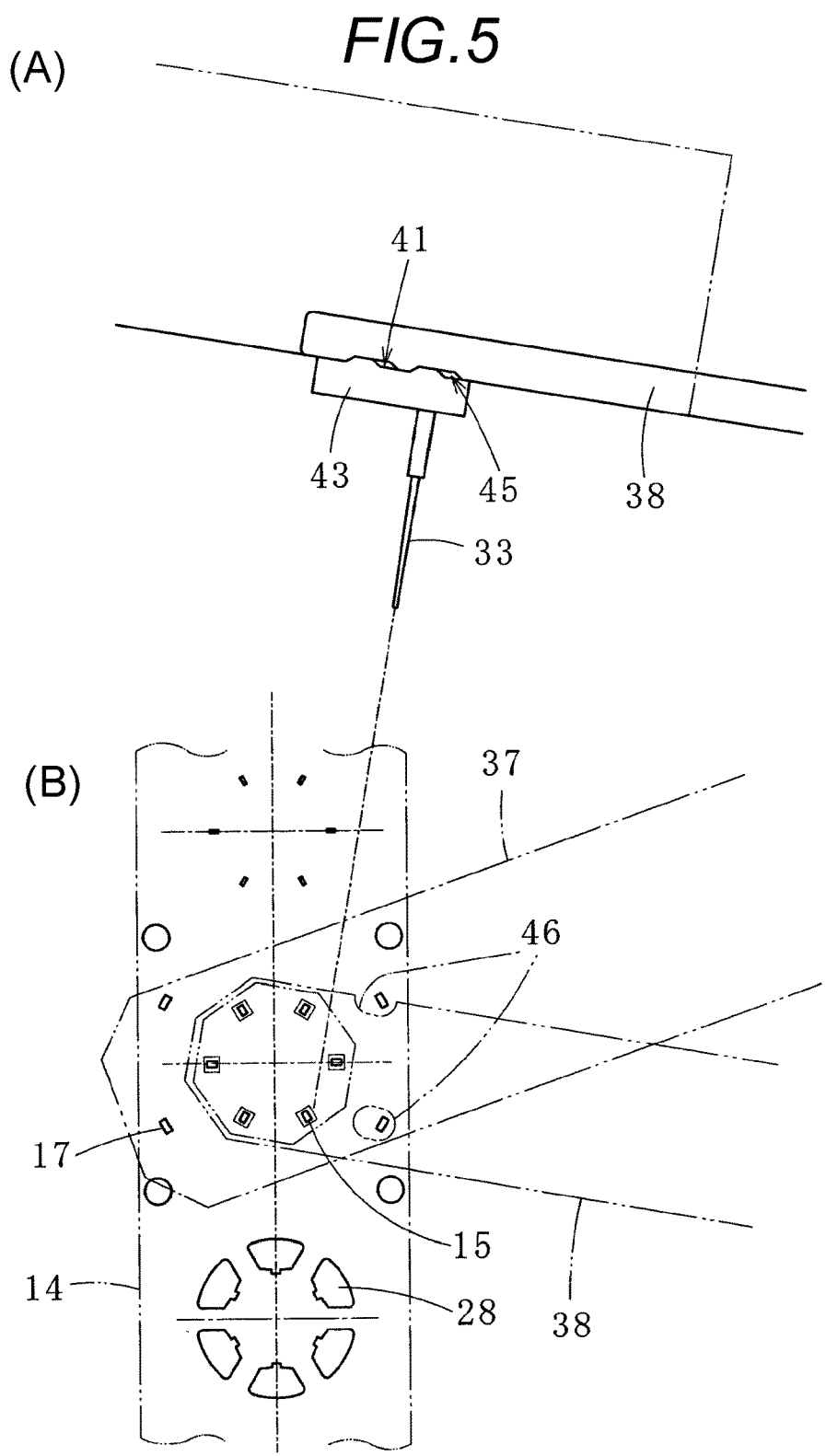
FIG. 5 includes (A) and (B) which are explanatory diagrams of the manufacturing apparatus used in the manufacturing method of the laminated iron core according to the exemplary embodiment.

(A) and (B) of FIG. 5 show the non-active state of the punch 33. The slide plate 38 moves forward so that the protruding parts of the slide cam 43 are fitted to recessed parts of the slide plate 38 so that a load of the upper die (the guide members 34 and 35) is not applied to the thin metal sheet 14. This state is applied to the iron core pieces 12 and 13 except the first iron core piece 11. To the first iron core piece 11, a position where the slide plate 38 is moved backward as shown in (A) and (B) of FIG. 4 is applied.

Now, a case shown in (A) and (B) of FIG. 6 and (A) and (B) of FIG. 7 will be described below that the four blanking holes 17 are formed together with the six caulking through holes 15 in the process 3a.

In a bottom part of the slide plate 37, recessed parts 49 to which top parts 48 of the four punches 32 can be fitted are provided. When the slide plate 37 is moved forward and backward, the punch 32 can be switched between an active state and a non-active state. FIG. 6 shows a cover member 37a which fixes the slide plate 37 so as to slide.

Figure 6:
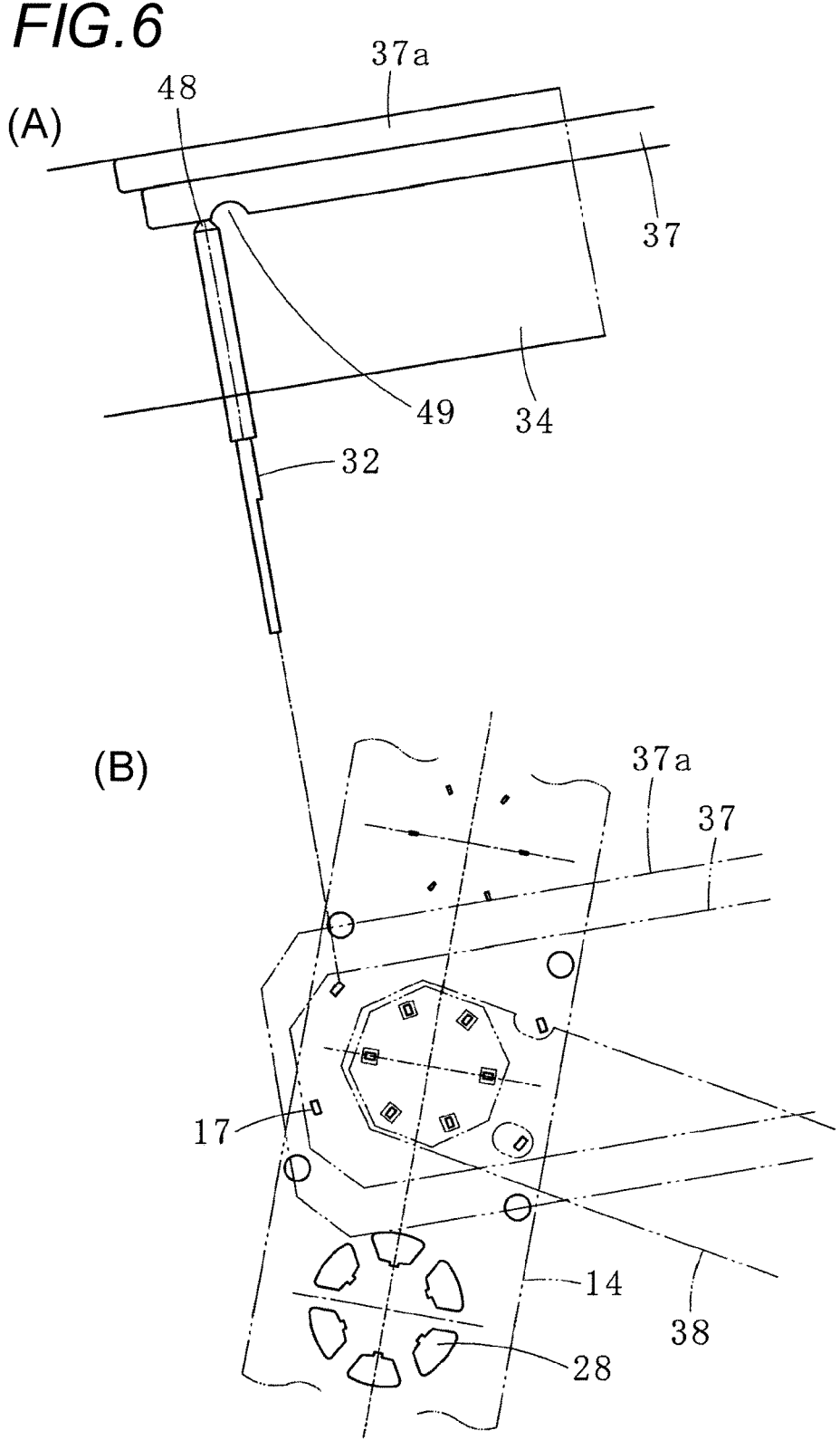
FIG. 6 includes (A) and (B) which are explanatory diagrams of the manufacturing apparatus used in the manufacturing method of the laminated iron core according to the exemplary embodiment.
Figure 7:
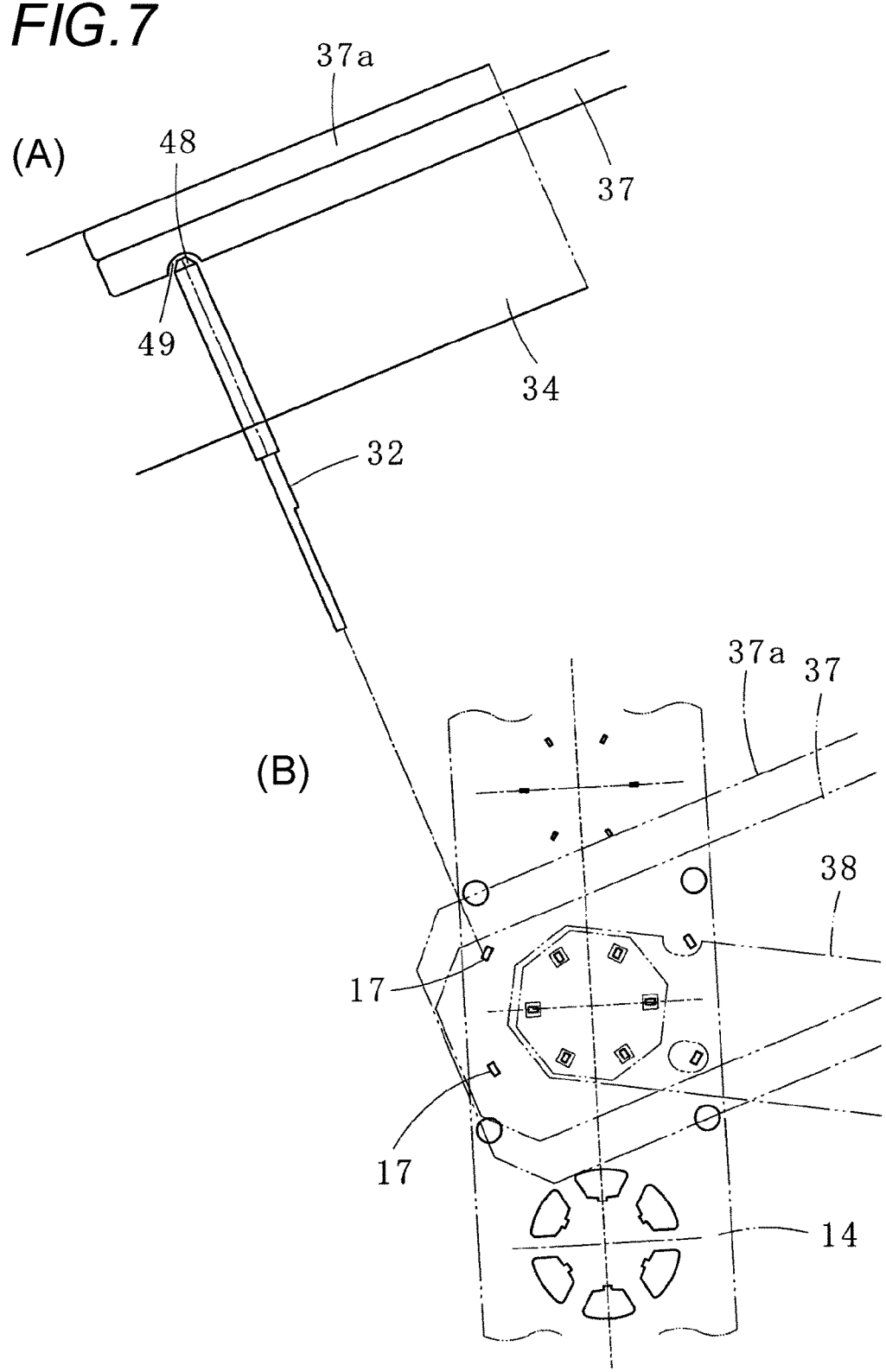
FIG. 7 includes (A) and (B) which are explanatory diagrams of the manufacturing apparatus used in the manufacturing method of the laminated iron core according to the exemplary embodiment.

When the punch 32 is operated, as shown in (A) and (B) of FIG. 6, the slide plate 37 is moved backward and the top part 48 of each of the punches 32 is held (positioned) by the slide plate 37. In this state, the punch 32 is lowered to form the four blanking holes 17 in the thin metal sheet 14 by the punching units formed with the dies and the punches 32.

The above-described process is carried out in the process 3a shown in FIG. 1B. The punches 32 and 33 are operated at the same time, so that the caulking through holes 15 and the blanking holes 17 are formed.

Further, a width of the slide plate 38 is formed to be smaller than a width of the slide plate 37. Thus, the size or the number of the partly cut out parts 46 can be reduced and made to be small. Accordingly, a rigidity of the guide member 34 can be held.

In the above-described exemplary embodiment, the caulking through holes 15 and the caulking parts (the V shaped caulking parts) 16 are formed in the separate processes and in the different stations. However, when forms of the punches and heights of upper operating positions and lower operating positions are varied, the caulking through holes and the caulking parts can be formed in the same station and the same process. In this case, a length of the die apparatus in the conveying direction of the thin metal sheet 14 is furthermore shortened.

In the above-described exemplary embodiment, the slide plates 37 and 38 are superposed in a vertical direction and the directions that the slide plates move forward and backward are set to the same direction. However, the directions that the slide plates move forward and backward (namely, positions of cylinders or the like) may be opposed relative to a feeding direction of the thin metal sheet.

Further, in the above-described exemplary embodiment, the blanking holes 17 and the caulking through holes 15 are worked in the same station. However, the present invention may be applied to combinations of other kinds of punch works.

What is claimed is:

1. A method of manufacturing a laminated iron core, the method comprising:
    performing at least two kinds of selectively-actuated punching processes by actuating respective punching units to form a plurality of iron core pieces, each of the punching units being switchable between an active state or a non-active state; and
    caulking and laminating the plurality of iron core pieces to manufacture the laminated iron core, wherein
    the at least two kinds of selectively-actuated punching processes are performed in one operation by selectively actuating each of the punching units between the active state and the non-active state,
    each of the punching units has a punch and a die and is controlled to switch between the active state and the non-active state by moving a slide member which holds a top part of the punch, and moving of the slide member of one of the punching units is located in a lower position than moving of the slide member of another one of the punching units.

2. The method according to claim 1, wherein the one operation includes processes performed in one station.

3. The method according to claim 1, wherein one of the punching units punches a working part located in an inside area of the iron core piece and another one of the punching units punches a working part located in an outside area of the iron core piece.

* * * * *